United States Patent Office 2,931,812
Patented Apr. 5, 1960

2,931,812

1-ALKENYL-3-ALKYL-6-AMINO-5-UREI-DOURACILS AND PROCESS

Max J. Kalm, Skokie, Ill., assignor to G. D. Searle & Co., Chicago, Ill., a corporation of Delaware No Drawing. Application January 3, 1958
Serial No. 706,905

10 Claims. (Cl. 260—256.4)

This invention relates to 1-alkenyl-3-alkyl 6-amino-5-ureidouracils, and processes for the manufacture thereof. More particularly, this invention relates to products of the formula

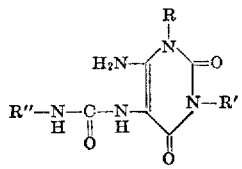

wherein R is an alkenyl radical, R' is an alkyl radical, and R" is either an alkenyl radical or an alkyl radical containing more than 1 carbon atom.

The alkenyl radicals comprehended by R and R" in the foregoing formula include vinyl, allyl, butenyl, methylallyl, and like univalent groupings derived by elimination of a single hydrogen atom from acyclic hydrocarbons comprising fewer than 9 carbon atoms and including a double bond. The alkyl radicals referred to by R' in the formula are desirably lower alkyl radicals, to wit, methyl, ethyl, propyl, isopropyl, butyl, isobutyl, tert.-butyl, pentyl, isopentyl, tert.-pentyl, neopentyl, hexyl, isohexyl, heptyl, octyl, and, in general, $C_nH_{2n+1}$ groupings wherein $n$ is a positive integer amounting to less than 9. These same lower alkyl radicals, moreover, are optimally adapted to the definition and purposes of R" in the formula, as aforesaid, with the single exception that the methyl grouping is excluded.

The compounds of this invention are useful because of their valuable and remarkably diverse pharmacological activity. Especially, they are appetite inhibitors; but they also manifest anti-secretory, anti-iritic, and anti-viral properties, and are to a greater or lesser extent barbiturate potentiators, as well as mild diuretics.

Manufacture of the subject compositions proceeds by heating an appropriate 5,6-diaminouracil of the formula

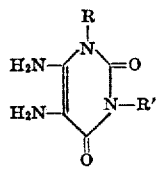

with a selected isocyanate of the formula

R, R', and R" being defined as hereinafter. Alternatively, a corresponding isothiocyanate

can be substituted for the above isocyanate—desirably in the presence of an inert, chlorinated hydrocarbon solvent such as chloroform, carbon tetrachloride, dichloromethane, etc. and the thioureido compound which results can be converted to the ureido analog by mild heating in aqueous base with hydrogen peroxide. The latter procedure has the advantage that the isothiocyanates involved are unexceptionally stable intermediates, whereas certain of the isocyanates necessary to the first procedure are not so.

It will be recognized by those skilled in the art that the various products herein described are adapted to ring closure via the substituents in positions 5 and 6, either an amino or an alkylamino grouping being split out. Such closure does indeed sometimes occur on heating as for a melting point determination, and the result is that characteristic and definite melting point data are not always obtainable. In the circumstances, elemental and infrared analyses serve for identification and confirmation of purity.

The following examples described in detail certain of the uracils illustrative of the present invention and methods which have been devised for their manufacture. However, the invention is not to be construed as limited thereby, either in spirit or scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C), pressures in millimeters (mm.) of mercury, and relative amounts of materials in parts by weight, except as otherwise noted.

*Example 1*

A. *1-allyl-5,6-diamino-3-ethyluracil.*—To a solution of 213 parts of 1-allyl-6-amino-3-ethyluracil monohydrate and 69 parts of sodium nitrite in 1370 parts of water at 85–90° C. is added, with agitation, a solution of 65 parts of glacial acetic acid in 195 parts of water. The reaction mixture is maintained in the prescribed temperature range for 30 minutes, then chilled to 20° C. The bright purple nitroso compound precipitated is removed by filtration and washed with water. To a suspension of this material in 1350 parts of water is added 205 parts of concentrated ammonium hydroxide. The resultant solution is heated to 45° C., whereupon sufficient sodium hydrosulfite is introduced—portionwise—to discharge the orange-red color, while the temperature rises to 85° C. The yellow solution is filtered, hot. The filtrate is cooled and extracted with chloroform. The chloroform extract is dried over anhydrous sodium sulfate and then stripped of solvent by evaporation at reduced pressures. The crystalline residue, recrystallized from ethyl acetate, melts at 138.5–141.5° C. (corrected). This material is 1-allyl-5,6-diamino-3-ethyluracil.

B. *1-allyl - 6 - amino - 3 - ethyl - 5 - (3 - ethylureido)-uracil.*—To a solution of 29 parts of 1-allyl-5,6-diamino-3-ethyluracil in 220 parts of chloroform is added 10 parts of ethyl isocyanate. Heat is evolved. When the exothermic effect begins to subside, the solution is heated at the boiling point under reflux for 30 minutes and then chilled. 1-allyl-6-amino-3-ethyl-5-(3-ethylureido)-uracil precipitates. Recovered on a filter and recrystallized from a mixture of chloroform and benzene, the product melts at approximately 199–199.5° C. (corrected). It has the formula

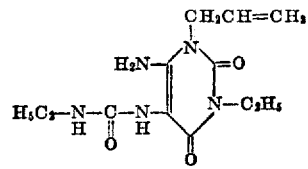

*Example 2*

*1-allyl - 6 - amino - 3 - ethyl - 5 - (3 - isopropylureido)-uracil.*—To 20 parts of 1-allyl-5,6-diamino-3-ethyluracil dissolved in 150 parts of chloroform is added 10 parts of isopropyl isothiocyanate (preparable from isopropylamine by the method described in Organic Syntheses, Collective Volume III, page 599, and which boils at 134–136° C.). The reactants are heated at the boiling point for 45 minutes, during which time 1-allyl-6-amino-3-ethyl-5-(3-isopropyl - 2 - thioureido)uracil precipitates. This material is removed by filtration and suspended in 200 parts of water containing 5 parts of caustic soda. Approximately 28 parts of aqueous 30 percent hydrogen peroxide is then cautiously introduced at temperatures in the range, 45–50° C., following which the mixture is heated to 80° C., and at last, chilled. Precipitation occurs. The material thrown down is 1-allyl-6-amino-3-ethyl-5-(3-isopropylureido)uracil, which is further purified by recrystallization from alcohol. The product has the formula

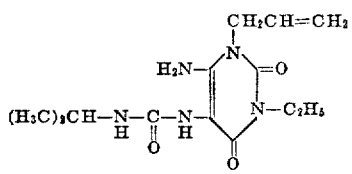

*Example 3*

*1-allyl - 6 - amino - 5 - (3 - butylureido) - 3 - ethyluracil.*—Using the technique of Example 2, 20 parts of 1-allyl-5,6-diamino-3-ethyluracil is reacted with approximately 11 parts of butyl isothiocyanate in 150 parts of chloroform to produce 1-allyl-6-amino-5-(3-butyl-2-thioureido)uracil, which is desulfurized by treating 24 parts thereof in 260 parts of water containing 6 parts of caustic soda with 34 parts of aqueous 30 percent hydrogen peroxide. The desired 1-allyl-6-amino-5-(3-butylureido)-3-ethyluracil thus obtained, crystallized from alcohol, melts at 181–184° C. (corrected). It has the formula

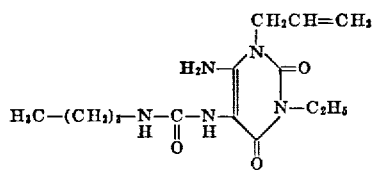

*Example 4*

*1-allyl - 6 - amino - 3 - ethyl - 5 - (3 - pentylureido)-uracil.*—Using the technique of Example 1B, 13 parts of 1-allyl-5,6-diamino-3-ethyluracil is reacted with 7 parts of n-amyl isocyanate (preparable from hexanoyl chloride by the procedure described in Organic Syntheses, Collective Volume III, page 846, and which boils at 86.5–87.0° C. under 140 mm. pressure) in 195 parts of chloroform to give 1-allyl-6-amino-3-ethyl-5-(3-pentylureido)uracil, which, recrystallized from alcohol, melts at 179–180.5° C. (corrected). The product has the formula

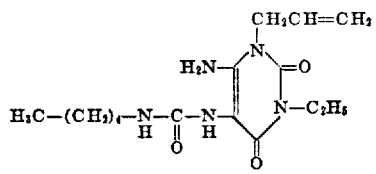

*Example 5*

*6-allyl - 6 - amino - 3 - ethyl - 5 - (3 - heptylureido)-uracil.*—Using the technique of Example 1B, 15 parts of 1-allyl-5,6-diamino-3-ethyluracil and 10 parts of heptyl isocyanate (preparable from octanoyl chloride by the procedure described in Organic Syntheses, Collective Volume III, page 846, and which boils at 99–103° C. under 48 mm. pressure) in 225 parts of chloroform are reacted together to produce 1-allyl-6-amino-3-ethyl-5- (3-heptylureido)uracil, which, recrystallized from alcohol, melts at approximately 175–176° C. (corrected). The product has the formula

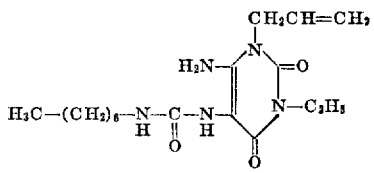

*Example 6*

A. *5,6 - diamino - 3 - methyl - 1 - (2 - methylallyl)-uracil.*—To a solution of 195 parts of 6-amino-3-ethyl-1-(2-methylallyl)uracil and 69 parts of sodium nitrite in 1375 parts of water at 85–90° C. is added, with agitation, a solution of 65 parts of glacial acetic acid in 195 parts of water. The reaction mixture is maintained in the prescribed temperature range for 30 minutes, then chilled to 20° C. The bright purple nitroso compound precipitated is removed by filtration and washed with water. To a suspension of this material in 1350 parts of water is added 205 parts of concentrated ammonium hydroxide. The resultant solution is heated to 45° C., whereupon sufficient sodium hydrosulfite is introduced—portionwise—to discharge the orange-red color, while the temperature rises to 85° C. The yellow solution is filtered, hot. From the chilled filtrate, there crystallizes pure 5,6-diamino-3-methyl-1-(2-methylallyl)uracil, the melting point of which is 148–153° C. (corrected).

B. *6-amino-5-(3-ethylureido)-3 - methyl - 1-(2-methylallyl)uracil.*—Using the technique of Example 1B, approximately 3 parts of 5,6-diamino-3-methyl-1-(2-methylallyl)uracil is reacted with 1 part of ethyl isocyanate in 25 parts of chloroform to give 6-amino-5-(3-ethylureido)-3-methyl-1-(2-methylallyl)uracil, which, recrystallized from a mixture of chloroform and benzene, melts at 212–214° C. The product has the formula

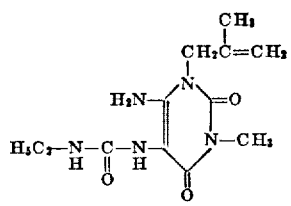

*Example 7*

*6-amino-3-methyl-1-(2-methylallyl)-5 - (3 - isopropylureido)uracil.*—Using the technique of Example 2, 20 parts of 5,6-diamino-3-methyl-1-(2-methylallyl)uracil and 10 parts of isopropyl isothiocyanate in 150 parts of chloroform are reacted together to produce 6-amino-3-methyl-1-(2-methylallyl)-5-(3-isopropyl - 2 - thioureido)-uracil, which is converted to the corresponding desulfurized material by treating 15 parts of the thioureido compound in 175 parts of water containing 4 parts of caustic soda with 22 parts of aqueous 30 percent hydrogen peroxide. The 6-amino-3-methyl-1-(2-methylallyl)-5-(3-isopropylureido)uracil thus obtained is further purified by recrystallization from alcohol. The product has the formula

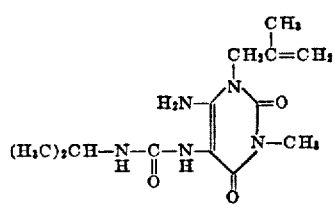

*Example 8*

*6-amino-5-(3-butylureido)-3-methyl - 1 - (2 - methyl-* allylyuracil.—Using the technique of Example 2, 20 parts of 5,6-diamino-3-methyl-1-(2-methylallyl)uracil is reacted with 11 parts of butyl isothiocyanate in 150 parts of chloroform to give 6-amino-5-(3-butyl-2-thioureido)-3-methyl-1-(2-methylallyl)uracil, 4 parts of which is suspended in 50 parts of water containing 1 part of caustic soda and treated with 6 parts of aqueous 30 percent hydrogen peroxide to produce 6-amino-5-(3-butylureido)-3-methyl-1-(2-methylallyl)uracil. This product, crystallized from a mixture of chloroform and benzene, melts at 172.5–174.5° C. (corrected). It has the formula

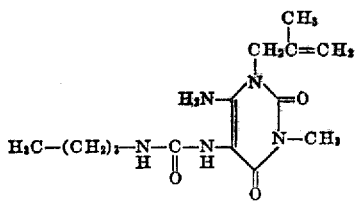

*Example 9*

6-amino - 3-methyl-1-(2 - methylallyl)-5-(3 - pentylureido)uracil.—Using the technique of Example 1B, 20 parts of 5,6-diamino-3-methyl-1-(2-methylallyl)uracil is reacted with approximately 11 parts of n-amyl isocyanate in 300 parts of chloroform to give 6-amino-3-methyl-1-(2-methylallyl)-5 - (3 - pentylureido)uracil, which, recrystallized in 300 parts of chloroform to give 6-amino-3-methyl-1-(2-methylallyl)-5-(3-pentylureido)uracil, which, recrystallized from alcohol, melts at approximately 182–183° C. (corrected). The product has the formula

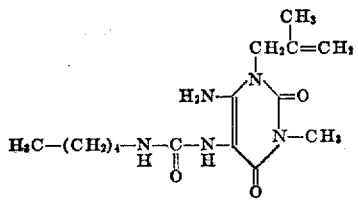

*Example 10*

6-amino-5-(3-heptylureido)-3-methyl - 1 - (2-methylallyl)uracil.—Using the technique of Example 1B, 15 parts of 5-6-diamino-3-methyl-1-(2-methylallyl)uracil is reacted with approximately 10 parts of heptyl isocyanate in 225 parts of chloroform to give 6-amino-5-(3-heptylureido)-3-methyl-1 - (2 - methylallyl)uracil, which, recrystallized from alcohol, melts at approximately 175–176° C. (corrected). The product has the formula

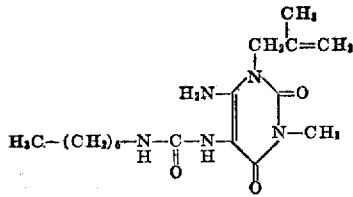

*Example 11*

5-(3-allylureido)-6-amino-3-methyl - 1 - (2 - methylallyl)uracil.—Using the technique of Example 2, 100 parts of 5,6-diamino-3-methyl-1-(2-methylallyl)uracil is reacted with approximately 47 parts of allyl isothiocyanate in 1125 parts of chloroform to give 5-(3-allyl-2-thioureido)-6-amino-3-methyl-1-(2-methylallyl)uracil, 8 parts of which is desulfurized by suspension in 100 parts of water containing approximately 2 parts of caustic soda and subsequent treatment with 12 parts of aqueous 30 percent hydrogen peroxide. The 5-(3-allylureido)-6-amino-3-methyl-1-(2-methylallyl)uracil thus obtained is further purified by recrystallization from alcohol. It melts at 188–190° C. (corrected) has the formula

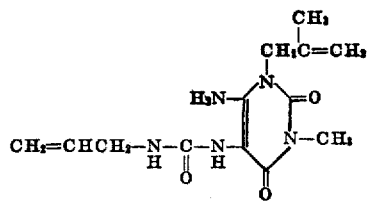

*Example 12*

6 - amino - 3 - methyl-1-(2-methylallyl)-5-[3-(2-methylallyl)ureido]uracil.—Using the technique of Example 2, 252 parts of 5,6-diamino-3-methyl-1-(2-methylallyl)uracil is reacted with approximately 141 parts of 2-methylallyl isothiocyanate in 2400 parts of chloroform to give 6-amino-3-methyl-1-(2-methylallyl)-5-[3-(2-methylallyl)-2-thioureido]uracil, 4 parts of which in a mixture of 50 parts of water with 1 part of caustic soda is desulfurized by addition of 6 parts of aqueous 30 percent hydrogen peroxide. The 6-amino-3-methyl-1-(2-methylallyl)-5-[3-(2-methylallyl)ureido]uracil which results is purified further by recrystallization from a mixture of chloroform and benzene. The product melts at 192.5–194° C. (corrected) and has the formula

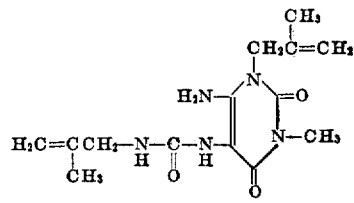

*Example 13*

A. *5,6-diamino-3-ethyl-1-(2-methylallyl)uracil.*—Substitution of 209 parts of 6-amino-3-ethyl-1-(2-methylallyl)uracil for 213 parts of 1-allyl-6-amino-3-ethyluracil monohydrate in the procedure of Example 1A affords 5,6-diamino-3-ethyl-1-(2-methylallyl)uracil.

B. *6-amino-3-ethyl-5-(3-ethylureido)-1-(2-methylallyl)uracil.*—Using the technique of Example 1B, 22 parts of 5,6 - diamino-3-ethyl-1-(2-methylallyl)uracil is reacted with approximately 7 parts of ethyl isocyanate in 150 parts of chloroform to give 6-amino-3-ethyl-5-(3-ethylureido)-1-(2-methylallyl)uracil. The product has the formula

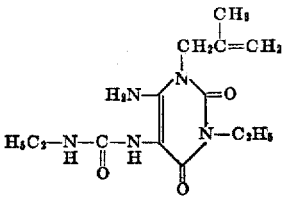

*Example 14*

A. *6-amino-1-(2-methylallyl)-3-octyluracil.*—To a solution of 181 parts of 6-amino-1-(2-methylallyl)uracil in 800 parts of alcohol is added 69 parts of powdered anhydrous potassium carbonate and 193 parts of octyl bromide. The mixture is heated at the boiling point under reflux overnight, following which it is cooled to room temperatures and filtered. Solvent is removed by distillation at reduced pressures, whereupon the residue is taken up in chloroform. The chloroform extract is washed with aqueous caustic soda to remove unreacted starting material. Distillation of solvent leaves as a residue 6-amino-1-(2-methylallyl)-3-octyluracil, which is further purified by chromatography.

B. *5,6-diamino-1-(2-methylallyl)-3-octyluracil.*—To a solution of 100 parts of 6-amino-1-(2-methylallyl)-3-octyluracil and 24 parts of sodium nitrite in 470 parts of water at 85–90° C. is added, with agitation, a solution of 22 parts of glacial acetic acid in 67 parts of water. The reaction mixture is maintained in the prescribed temperature range for 30 minutes, then chilled to 20° C. The precipitated nitroso compound is removed by filtration and washed with water. To a suspension of this material in 460 parts of water is added 70 parts of concentrated ammonium hydroxide. The resultant solution is heated to 45° C., whereupon sufficient sodium hydrosulfite is introduced—portionwise—to discharge the orange-red color, while the temperature rises to 85° C. The yellow solution is filtered, hot. The filtrate is cooled and extracted with chloroform. The chloroform extract is dried over anhydrous sodium sulfate and then stripped of solvent by evaporation at reduced pressures. There remains as a residue the desired 5,6-diamino-1-(2-methylallyl)-3-octyluracil.

C. *6-amino-5-(3-ethylureido)-1-(2-methylallyl)-3-octyluracil.*—Using the technique of Example 1B, 30 parts of 5,6-diamino-1-(2-methylallyl)-3-octyluracil is reacted with 7 parts of ethyl isocyanate in 300 parts of chloroform to produce 6-amino-5-(3-ethylureido)-1-(2-methylallyl)-3-octyluracil. The product has the formula

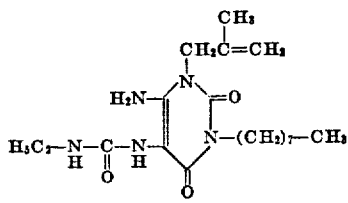

What is claimed is:
1. A compound of the formula

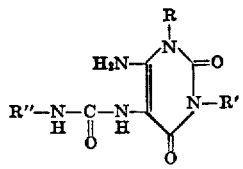

wherein R is selected from the group consisting of allyl and methylallyl radicals, R' is a lower alkyl radical, and R" is selected from the group consisting of lower alkyl radicals containing more than 1 carbon atom and alkenyl radicals containing less than 5 carbon atoms.

2. A compound of the formula

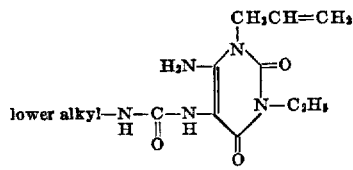

3. 1-allyl-6-amino-3-ethyl-5-(3-ethylureido)uracil.
4. 1-allyl-6-amino-3-ethyl-5-(3-isopropylureido)uracil.
5. 1-allyl-6-amino-3-ethyl-5-(3-heptylureido)uracil.
6. A compound of the formula

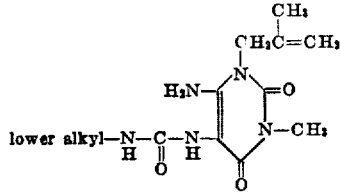

7. 6 - amino-5-(3-ethylureido)-3-methyl-1-(2-methylallyl)uracil.

8. 6 - amino-3-methyl-1-(2-methylallyl)-5-[3-(2-methylallyl)ureido]uracil.

9. In a process for the manufacture of compounds of the formula

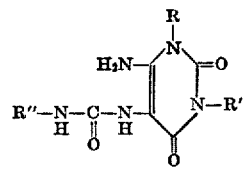

wherein R is selected from the group consisting of allyl and methylallyl radicals, R' is a lower alkyl radical, and R" is selected from the group consisting of lower alkyl radicals containing more than 1 carbon atom and alkenyl radicals containing less than 5 carbon atoms, the steps which comprise heating a 5,6-diaminouracil of the formula

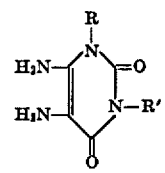

with an isothiocyanate of the formula R"NCS in an inert solvent, and heating the resultant thioureide in aqueous caustic with hydrogen peroxide, R, R', and R" being defined as before.

10. In a proces for the manufacture of compounds of the formula

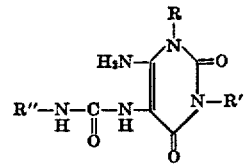

wherein R is selected from the group consisting of allyl and methylallyl radicals, R' is a lower alkyl radical, and R" is selected from the group consisting of lower alkyl radicals containing more than 1 carbon atom and alkenyl radicals containing less than 5 carbon atoms, the steps which comprise heating a 5,6-diaminouracial of the formula

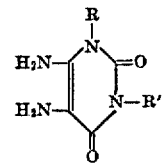

with an isothiocyanate of the formula R"NCS in chloroform, and heating the resultant thioureide in aqueous caustic soda with 30 percent hydrogen peroxide, R, R', and R" being defined as before.

References Cited in the file of this patent
UNITED STATES PATENTS
2,663,707  Conroy _____ Dec. 22, 1953

OTHER REFERENCES
Wertheim: Textbook of Organic Chemistry (Second Edition), p. 276 (1945).